US007945548B2

(12) United States Patent
Dalton et al.

(10) Patent No.: US 7,945,548 B2
(45) Date of Patent: May 17, 2011

(54) METHOD FOR SOURCING REPLACEMENT PARTS

(75) Inventors: A. Ray Dalton, Hudson, OH (US); Dan Betting, Columbia Station, OH (US)

(73) Assignee: PartsSource, Inc., Aurora, OH (US)

( * ) Notice: Subject to any disclaimer, the term of this patent is extended or adjusted under 35 U.S.C. 154(b) by 185 days.

(21) Appl. No.: 11/649,518

(22) Filed: Jan. 3, 2007

(65) Prior Publication Data

US 2007/0156675 A1 Jul. 5, 2007

Related U.S. Application Data

(60) Provisional application No. 60/755,655, filed on Dec. 30, 2005.

(51) Int. Cl.
 *G06F 17/30* (2006.01)
(52) U.S. Cl. .......................... 707/705; 707/723; 707/752
(58) Field of Classification Search .................. 707/3, 5, 707/705, 723, 752; 705/28, 29
See application file for complete search history.

(56) References Cited

U.S. PATENT DOCUMENTS

| | | | |
|---|---|---|---|
| 5,765,143 A | 6/1998 | Sheldon et al. | |
| 6,587,827 B1 | 7/2003 | Hennig et al. | |
| 6,622,127 B1 | 9/2003 | Klots et al. | |
| 6,798,997 B1 | 9/2004 | Hayward et al. | |
| 6,856,968 B2 | 2/2005 | Cooley et al. | |
| 6,920,427 B2 | 7/2005 | Anthony et al. | |
| 6,928,396 B2 * | 8/2005 | Thackston | 703/1 |
| 7,124,148 B2 * | 10/2006 | Sauermann | 707/103 R |
| 7,437,320 B2 * | 10/2008 | Davidson et al. | 705/27 |
| 2001/0027429 A1 | 10/2001 | Uemura | |
| 2001/0034656 A1 * | 10/2001 | Lucas et al. | 705/26 |
| 2002/0087419 A1 | 7/2002 | Andersson et al. | |
| 2003/0055812 A1 * | 3/2003 | Williams et al. | 707/1 |
| 2003/0212581 A1 | 11/2003 | Adolph et al. | |
| 2003/0229551 A1 | 12/2003 | Kobayashi | |
| 2004/0019534 A1 | 1/2004 | Callahan et al. | |
| 2004/0030610 A1 | 2/2004 | Mimura | |
| 2004/0044595 A1 | 3/2004 | Castro | |
| 2004/0044598 A1 | 3/2004 | Hosaka | |
| 2004/0117383 A1 * | 6/2004 | Lee et al. | 707/100 |
| 2004/0167833 A1 | 8/2004 | Schickler | |
| 2005/0075950 A1 | 4/2005 | Lewis et al. | |
| 2005/0080687 A1 | 4/2005 | Self | |
| 2005/0125261 A1 | 6/2005 | Adegan | |
| 2005/0171867 A1 | 8/2005 | Doonan et al. | |
| 2005/0187834 A1 | 8/2005 | Painter et al. | |
| 2007/0038516 A1 * | 2/2007 | Apple et al. | 705/14 |

FOREIGN PATENT DOCUMENTS

WO 0131485 3/2001
WO WO 01/31485 A2 * 5/2001

* cited by examiner

*Primary Examiner* — Vincent Boccio
*Assistant Examiner* — Thuy (Tiffany) Bui
(74) *Attorney, Agent, or Firm* — Robert D. Emerson; Daniel A. Thomson; Emerson Thomson Bennett, LLC

(57) ABSTRACT

A method of sourcing a piece of equipment or a replacement part includes preparing a part request record, providing a part source database, searching part source records in the database according to one or more search parameters associated with the part, part requestor or part source, creating a prospective part source list, and prioritizing the part source list by one or more indexing fields, to identify sources predicted to have the part at the best combination of quality, price, and other similar factors. A method of updating the indexing fields is also disclosed.

9 Claims, 3 Drawing Sheets

METHOD FOR SOURCING REPLACEMENT PARTS

This application claims priority to U.S. Ser. No. 60/755,655, entitled METHOD FOR SOURCING REPLACEMENT PARTS, filed Dec. 30, 2005, which is incorporated herein by reference.

I. BACKGROUND OF THE INVENTION

A. Field of Invention

This invention pertains to the art of methods and apparatuses for locating and purchasing replacement parts, including replacement parts for health care related equipment.

B. Description of the Related Art

Hospitals, health care facilities, clinics, and other similar health care service centers have access to a wide variety of medical equipment used for diagnosing and treating patients. Such equipment may include heart rate monitors, ultrasound machines, magnetic resonance imaging machines, CT-scanners, electronic thermometers, x-ray machines, mammography machines, incubators, and the like, as well as laboratory equipment, such as spectrometers, microscopes, centrifuges, and the like. Even the smallest clinic will have several pieces of equipment from several different manufacturers. This equipment typically requires periodic maintenance, including the replenishment of consumables and the replacement of worn or broken parts. Servicing a wide range of equipment from a wide range of manufacturers, distributors, and retailers, can be a complicated and expensive process.

In many cases, machines give no warning of a breakdown and, therefore, the associated personnel have no spare parts on hand to make the repair. Thus, under significant time constraints to make the machine operable, someone from the facility must quickly locate and secure a replacement part. Often this entails contacting the manufacturer or distributor from whom the machine was purchased. While it is likely that the manufacturer or distributor will be able to provide the necessary part, it is probable that the facility will pay premium pricing for the part under those circumstances. The facility may accept this premium pricing due to the urgency of its need, the lack of alternative contacts, concerns about the quality of parts from other sources, and/or the unwillingness to investigate other options. In some instances, the manufacturer or distributor may simply not have the part readily available for shipping or may no longer service the machine, particularly if the machine is an older model. In this case, the facility would have to investigate alternative suppliers for the part, which may take substantial time, and, may result in the selection of an alternative supplier that has poor quality service, parts, or pricing. Permitting the machine to remain inoperable for extended periods of time is usually not an option.

In the end, facilities may incur substantially higher maintenance costs due to a lack of competitive pricing and confidence in alternative suppliers. Medical facilities are under increasing pressure to control rising healthcare costs. If facilities had access to multiple vendors for a particular part, and could facilitate competitive pricing between the vendors, facilities might be able to reduce their maintenance costs. However, locating multiple parts vendors for each machine at a facility is extremely difficult and merely identifying a plurality of vendors and selecting the lowest cost option available may not be the best solution for a facility. Unless the facility has a developed relationship with the various vendors, it will be unable to know whether the vendors are equal, namely whether they provide equivalently high quality parts that are readily available, are shipped in a timely manner, and are supported with good customer service. Moreover, amongst various vendors, parts and associated warranties may not be equivalent. One vendor may sell original parts, another may sell replacement parts, another may sell refurbished parts, and another may sell used parts. All of this variation may create insecurity on the part of the facility to use any vendor other than the manufacturer or distributor. However, if the facility had access to some form of this vendor data, even be it historical data, it could make a better decision on which vendor to use; being able to weigh the benefits and risks associated with each vendor, based on past transactions, in predicting the best part to purchase under the circumstances. Thus, an informed facility might elect to purchase a used part from a one vendor known for having good service and quality used parts rather than a new part from a different vendor having poor customer service and a history of untimely shipping.

Finally, even an informed facility can find itself overwhelmed with the number of vendors available to service a particular part. Time may not permit contacting all of the potential vendors to determine whether a particular vendor can service a particular part at a particular moment subject to the particular circumstances facing the facility. Thus, it would be helpful if the list of available vendors could be prioritized according to certain criteria so that the facility could be provided an organized list in which the vendors at the top of the list (an arbitrary, exemplary designation) are predicted, based on measures of past transactions, to more likely be able to satisfy the requirements of the facility at any given time, than the vendors near the bottom of the list. In this way, the facility can increase its chances of finding the vendor offering the best combination of service, price, and availability with the fewest number of attempted vendor contacts.

It would be advantageous, therefore, to provide the healthcare field with access to a large, centralized community of parts vendors that service a wide variety of equipment generally found in medical facilities. It further would be advantageous if relevant contact and transaction performance information concerning the vendors in the community could be maintained in a centralized, searchable database. It would additionally be advantageous if a search of the database of vendors, using a first set of criteria, such as part number or machine manufacturer, would return a list of prospective vendors from the community prioritized based on a predictive measure of which is most likely to be able to provide the part. It would also be advantageous if the list of prospective vendors could be further organized according to an algorithm comprising a second set of criteria, such as vendor quality characteristics, so as to provide a prioritized list of prospective vendors whereby specific vendors can be selected and contacted in a preferential order. It would further be advantageous if data from each vendor transaction could be fed back into the algorithm thereby influencing the prioritization of future prospective vendor lists. The present invention provides such a method.

II. BRIEF DESCRIPTION OF THE DRAWINGS

The invention may take physical form in certain parts and arrangement of parts, at least one embodiment of which will be described in detail in this specification and illustrated in the accompanying drawings which form a part hereof and wherein.

III. SUMMARY OF THE INVENTION

Figure 1:
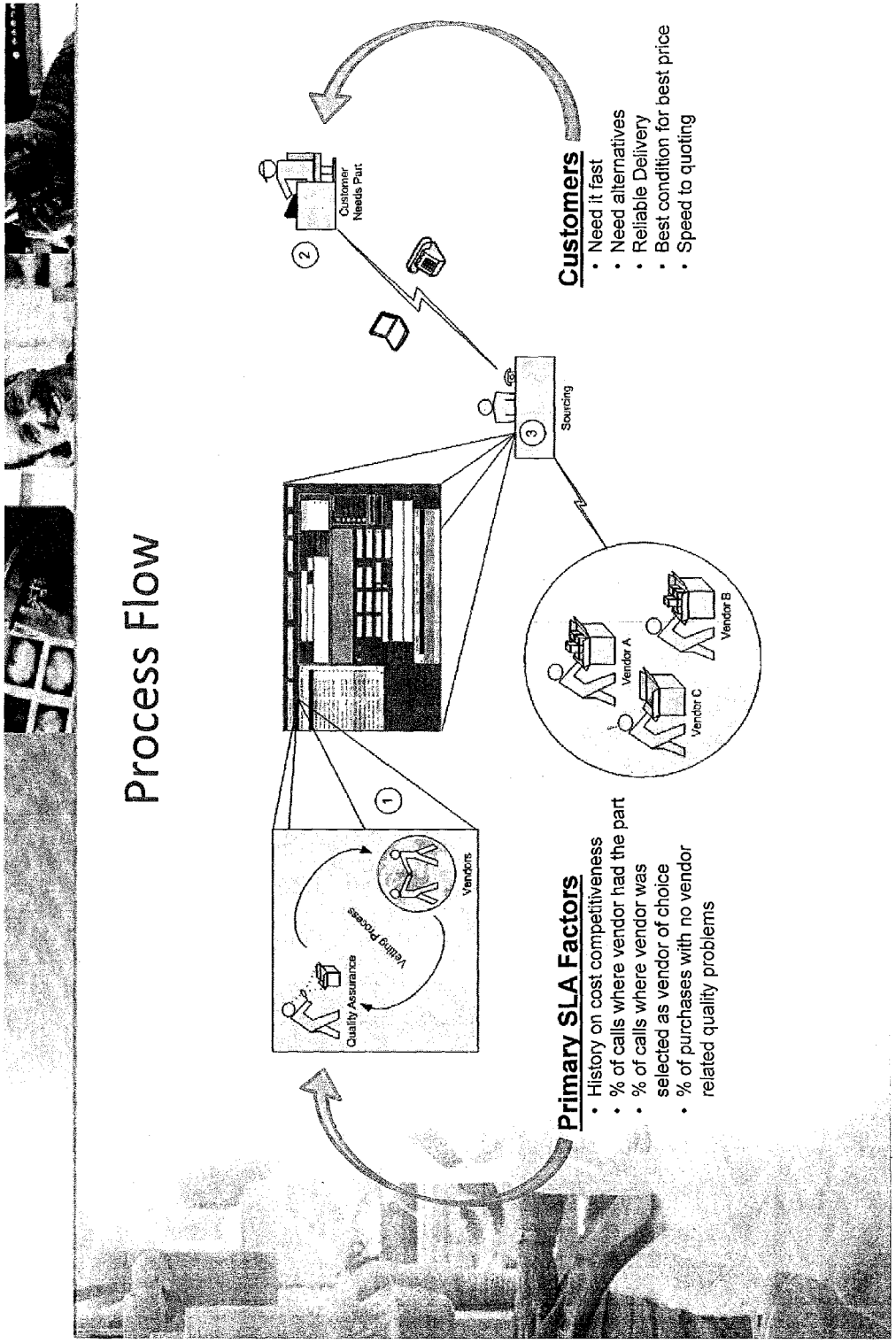
FIG. 1 shows the process flow of an embodiment of the invention.
Figure 2:
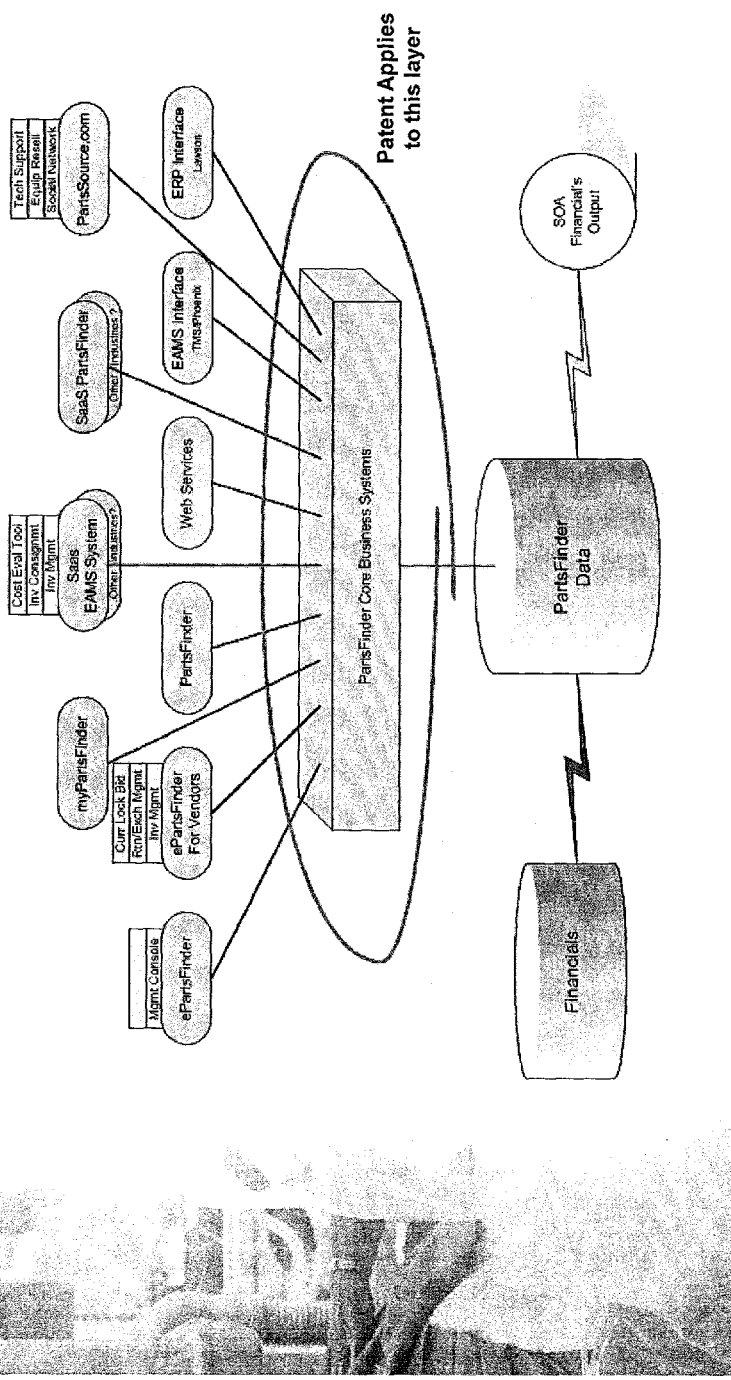
FIG. 2 shows a flow chart of various components.
Figure 3:
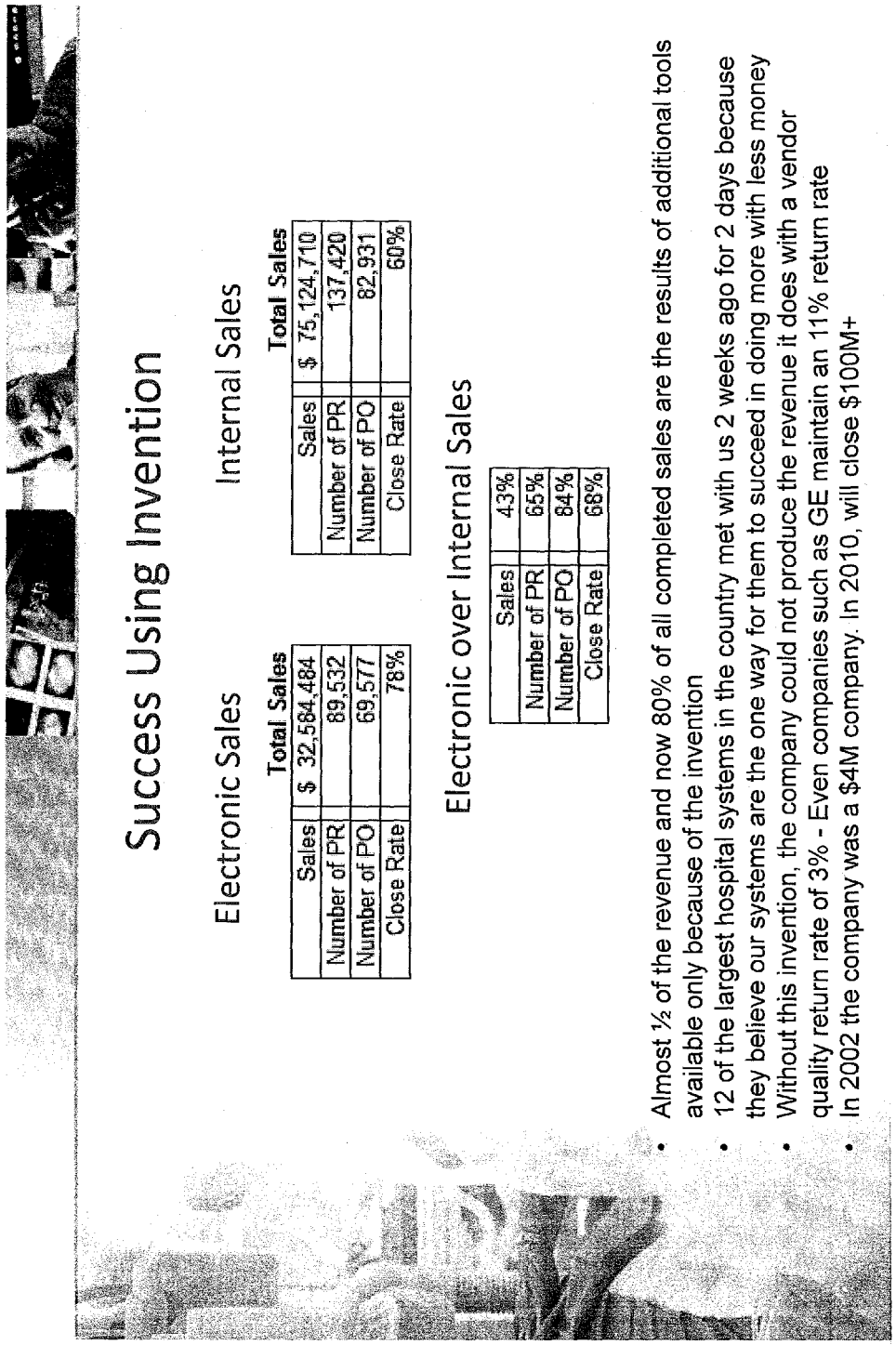
FIG. 3 shows financial data showing the success of the invention.

According to one aspect of the present invention, a method for locating and purchasing replacement parts for medical equipment is taught. The method may include the steps of providing a sourcing database of part source records. The part source records may be records associated with sources, such as vendors, of parts and associated equipment, and may include at least first and second, and preferably at least third and fourth indexing fields. The first indexing field may be a source contact field. The second indexing field may be a part ID field or a part type field. The third and fourth indexing fields may be preferred variable fields or quality assurance fields, which are described in further detail below. The method may further include searching the part source records according to a search parameter that is associated with the part to be sourced, such as the part model number, part serial number, part manufacturer, associated equipment model number, associated equipment serial number, or associated equipment manufacturer, to create a list of prospective part sources. The method may further include prioritizing the list of prospective part sources based on at least two, and in other embodiments, three or more of the indexing fields.

The method may include prioritizing the prospective part sources based on the part type or part ID indexing field, then further prioritizing the prospective part sources based on the preferred variable indexing field; and then further prioritizing the prospective part sources based on a quality assurance rating.

According to another aspect of the invention, the quality assurance rating may be measured with respect to at least a first, and in other embodiments, at least a second, and in still other embodiments, more than two, quality assurance fields, and in yet another embodiment, all of the quality assurance fields in the part source record, which quality assurance fields may include a part availability field, part pricing field, timeliness field, part accuracy field, and part quality field.

According to another aspect of the invention, each quality assurance field may give rise to a calculable quality assurance compliance factor. The calculation of a quality assurance field compliance factor may be the number of positive transactions in the quality assurance field divided by the total number of transactions with the part source.

According to another aspect of the invention, the associated quality assurance compliance factors may be selectively updated with each transaction with a part source.

Still other benefits and advantages of the invention will become apparent to those skilled in the art to which it pertains upon a reading and understanding of the following detailed specification.

IV. DESCRIPTION OF THE PREFERRED EMBODIMENT

One embodiment of the invention will now be described. As described below, the exemplary embodiment refers to methods and processes used in the selection and purchase of replacement parts for medical equipment. It should be understood that the reference to medical equipment is not intended to be limiting, as the invention may be applicable to the selection and purchase of replacement parts for other types of equipment. Furthermore, it should be understood that the invention is suitable for selecting and purchasing medical equipment and is not restricted simply to sourcing replacement parts for medical equipment.

Now describing one preferred embodiment of the invention, there is provided a method of sourcing parts which may include the steps of preparing a part request record, accessing a sourcing database to create a list of prospective sources for supplying a part, prioritizing the list of prospective sources according to a plurality of factors, which factors are selected to create a prioritization that predicts success in sourcing the part, and contacting prospective sources to secure a part. The present invention may include other steps, which will be elucidated in further detail in the course of discussing the embodiments of the invention herein.

Preparing a Part Request Record:

It is contemplated, in one embodiment of the invention, that a person or facility in need of a part (the "part requester") may create or authorize the creation of a part request record. The part request record may be a record of information concerning the part that needs to be sourced, and may include the model or serial number of the part, the part manufacturer, if known, the manufacturer of the associated equipment, and/or the model or serial number of the associated equipment for which the part is being purchased. The part request record may further include information identifying the part requester, including the part requester's address, contact, telephone number, and the like. As noted above, the part requester may create the part request record directly, for example by completing a form, which may be available remotely as through an interne site. Alternatively, the part requester may authorize the creation of a part request record through a third party, such as through a sourcing agent, which may have access to the sourcing database (discussed below.) The part request record form may be an electronic form disposed in the context of a software program, which may further incorporate the element of the sourcing database.

Sourcing the Part:

Sourcing the part requested by the part requester may include trying to locate the part within a parts inventory and/or trying to locate a source for the part within the sourcing database. In one embodiment, for example, there may exist a parts inventory containing, for example, parts that are commonly requested by parts requesters. The part inventory may include parts that are difficult to source, such as parts that are no longer available, sold, manufactured, or the like through traditional part sources, such as may be listed in the sourcing database. It is contemplated that the parts inventory may be maintained by the sourcing agent. Suitable identification of the parts in the inventory may be maintained in a parts inventory database which may be maintained in a manner that allows the inventory to be searched via the parts inventory database based on selected information from the parts request record to determine if the part to be sourced is in stock in the parts inventory. If the requested part is in the parts inventory, the part may be sourced from the inventory and supplied to the part requester. The process of supplying the part from the part inventory to the part requester may involve one or more of the steps of locating the physical part in the parts inventory, shipping the part to the part requester, and issuing an invoice to the part requester.

Whether or not there is an effort to source the part in a parts inventory, it is contemplated that the method of sourcing the part of the present invention may include the steps of accessing a sourcing database to create a list of prospective sources suitable for supplying a part, prioritizing the list of prospective sources according to a plurality of factors, which factors are selected to create a prioritization that predicts success in sourcing the part, and contacting prospective sources to secure a part.

In accordance with the steps described above, it is contemplated that there is created a sourcing database, which may be created and/or maintained by the sourcing agent. The sourcing database may be operatively accessible to the part requester, either directly or indirectly through the sourcing agent.

The sourcing database may be a database containing a searchable inventory of part sources. A "part source" may be any provider of parts, including equipment. Part sources may include vendors, distributors, manufacturers, resellers, repair shops, and other similar outlets where parts and equipment that may be purchased by a parts requester may be obtained. Information on each part source may be stored in a "part source record" in the sourcing database. The parts source record may comprise searchable data fields. The data and text fields associated with the parts source record may include contact fields (name, address, telephone number, fax number), as well as other indexing fields. Indexing fields, in addition to the contact fields, may include searchable data and text fields containing information that may be suitable for use in narrowing and organizing (i.e. "indexing") parts sources according to search terms or parameters selected parts request record.

Exemplary of the type of indexing fields, there may be one or more "part ID" fields containing information about the types of equipment serviced and the types of parts generally available from the source. It is known, for example, that some sources may only offer parts for specific equipment manufacturers. In this case, the part source record may include a part ID field that identifies the specific equipment manufacturers supported by the source. In another example, the source may only offer parts for a specific type of equipment (i.e., X-ray machines) but from a wide array of equipment manufacturers. In this case, the part source record may include a part ID field that identifies the specific types of equipment supported by the source. It should be noted that these are exemplary of the types of part ID fields that may be contained in the part source record, but is not intended to be limiting.

The part source record may include one or more "part-type" indexing fields. A part-type field may include information about the origin of the parts offered by the source, principally, whether parts offered by the source are OEM or not, whether the parts are new, used, refurbished or a combination thereof, and/or whether and to what extent the parts may be warranted. It should be noted that these are exemplary of the types of part-type indexing fields that may be contained in the part source record, but is not intended to be limiting.

The part source record may include one or more "preferred variable" indexing fields. A preferred variable field may include information concerning the relationship between the part source and the sourcing agent or part requestor with respect to pricing, availability, warranty, or the like. For example, a preferred variable field may note the existence of a special pricing arrangement between the sourcing agent and the part source. Alternatively, a preferred variable field may note the existence of an exclusive partnership arrangement between the sourcing agent and the part source. Alternatively, a preferred variable field may note the existence of a special warranty arrangement or shipping arrangement. It should be noted that these are exemplary of the types of preferred variable fields that may be contained in the part source record, but is not intended to be limiting.

The part source record may include one or more "quality assurance" fields. A quality assurance field may include information relating to historical performance by the source in supplying parts. In one embodiment, the information in the quality assurance fields may reflect a summary of multiple or substantially all interactions between the part source and the sourcing agent or part requester. For example, there may be a quality assurance field that relates to part availability, namely, reflecting the part source's historical proclivity toward having the parts requested by the sourcing agent or part requestor available at the time of the request. This data may be collected by the sourcing agent or reported by the part requester based on the part source's ability to supply the requested part at the time the part source is contacted with a request for the part. If the part is or is not available from the part source, a notation may be entered in the appropriate quality assurance field accordingly. There may be a quality assurance field that relates to pricing, namely, are the part source's prices generally reasonable in light of other sources for the same part. This data may be collected, for example, in the course of comparing prices from different part sources contacted in relation to providing a part (as discussed below). Of course, pricing considerations may account for differences in part type, warranty, and the like. There may be a quality assurance field that relates to timeliness, namely, does the part source process part requests in a timely fashion. This data may be collected, for example, by tracking shipping complaints from the part requester, or by comparing the actual shipping time to the time projected by the part source, or in comparison to the shipping times of other similar part sources. There may be a quality assurance field that relates to accuracy, namely, does the part source process the correct part and/or does the part source select a suitable replacement part in the event the originally requested part is unavailable. This data may also be collected by tracking customer complaints or by comparing the part shipped against the part requested. There may be a quality assurance field that relates to quality, namely, does the part source have parts that are of high quality. The data may be collected by tracking part quality complaints or warranty claims.

As noted above, the quality assurance fields may be quantitatively evaluated on each transaction by means for example of a simple yes or no input for each of the quality assurance fields (i.e., was the part available, was it comparatively priced, was it shipped on time, was the right part selected, did the part fail in an untimely manner). Over the course of multiple transactions with a particular part source, it will be possible to calculate a quality assurance field compliance percentage with respect to each quality assurance field. This compliance percentage may be calculated as the number of positive transactions divided by the total number of transactions.

With the various quality assurance field compliance percentages calculated, it may be possible to calculate an overall quality assurance compliance factor. The quality assurance compliance factor may be comprised of a weighted or unweighted average of all or a selected number of compliance percentages. The sourcing agent or the parts requester may choose the respective weights of the quality assurance factors to determine the calculation of the quality assurance compliance factor.

Each part source may be assigned a quality assurance rating based on its quality assurance compliance factor. For example, in one embodiment, each part source may be identified as "exceeding", "regularly meeting", "mostly meeting", or "rarely meeting" quality assurance based on a comparison of the part source's overall quality assurance compliance factor with, for example, the average over all sources, or the average over a select subset of sources, or over objective standards selected by the sourcing agent or the part requester.

The combination of one or several indexing fields and the overall quality assurance compliance factor or rating from the parts source record, may be selected to create a source profile for each part source. The source profile may be used to prioritize sources to achieve a prediction on the likelihood that a source will have the part requester's part at the time of request.

Having described, briefly, the sourcing database, the implications of using the sourcing database and the source profile will be described.

Accessing the Sourcing Database:

As noted above, it is contemplated that the sourcing database may be accessible by the part requester. However, in the preferred embodiment, the sourcing database may be accessible to the sourcing agent. In a most preferred embodiment, the sourcing agent may be comprised of a customer service representative and a sourcing representative. The customer service representative may interface with the part requester to collect information for the part request form. The substantially completed part request form may then be made available to the sourcing representative, who may check the part request record against the parts inventory and/or the sourcing database in an effort to secure sourcing of the part.

In accessing the sourcing database, it is contemplated that the sourcing representative will search the universe of part source records in the sourcing database according to a first search parameter, which may be a search parameter related to the part being sourced, such as, for example, the model number, serial number, or manufacturer of the part or equipment associated with the part. Other information from the part request record may be selected as the first search parameter. It is contemplated that the first search parameter will limit the universe of part source records, and thus, prospective part sources, to those known to service the particular part, part manufacturer, or associated equipment manufacturer, based on information in the part source records. The list of sources identified through such a search is referred to as a prospective source list.

Depending on the number of results returned in response to the first search parameter, further restriction of the prospective source list may be obtained by searching within the prospective source list according to a second search parameter. The second search parameter, as with the first search parameter, may be selected from the part request record. Alternatively, the first or second search parameter may be chosen from information associated with the part source. For example, the first search parameter may be selected to find all part sources that provide parts for x-ray machines. A second search parameter may be selected to further limit prospective source list, to those that provide parts for x-ray machines from a specific manufacturer. A third search parameter may be selected to further restrict the prospective source list according to geographic region. Restricting the prospective source list according to geographic region may be appropriate to take advantage of faster shipping times, lower shipping rates, or later or earlier hours of operation due to differences in time zones. It will be noted that this is an exemplary list of three search parameters and is not intended to be limiting. It will be understood that other combinations of search parameter may be selected to narrow the prospective source list.

Prioritizing the List of Prospective Sources:

With the list of prospective part sources identified according to one or more search parameters, it is contemplated that the proactive source list will be prioritized according to each part source's most updated source profile. By prioritizing the prospective source list according to source profile, it is believed that the prospective source list will generally distinguish those sources that are most likely able to source the part at the best combination of service, price, warranty and the like, from those that are least likely to source the part or source the part suitably. By prioritizing the prospective source list in this way, the sourcing agent or part requester can make predictive selections on which sources to call, from what may otherwise be a substantial list of prospective sources.

It should be understood that the process of prioritizing the prospective source list may occur according to pre-selected conditions programmed into the operating program. However, in another embodiment, the sourcing agent, which may be the sourcing representative or the customer service representative, or the part requester may have some control in selecting the method of prioritization.

One method of prioritization will now be described. This method is exemplary and is not intended to be limiting as it will be understood that more than one method of prioritizing the prospective source list may be selected.

In one embodiment, the prospective source list may first be prioritized based on the indexing field of part type. Thus for example, all part sources providing OEM parts may be prioritized over non OEM part sources. OEM part sources may be the most likely to be able to supply the requested part. Having delineated between OEM and non-OEM part sources, the sources within each sub-group may be further prioritized according to a second indexing field, which may for example be a first preferred variable field, which may, for example indicate the existence of a partnership agreement between the sourcing agent and the source. The existence of a partnership agreement may afford the sourcing agent greater confidence in the source and its ability to supply the requested part under suitable terms. Having prioritized the OEM sources first, followed by the partner sources, the remaining sources (or the sources within sub group of OEM, non-OEM partner, and non-OEM, non-partner) may be prioritized according to a third indexing field, which may be a second preferred variable field, such as a field that indicates the presence of a preferred pricing arrangement between the sourcing agent and the source. The existence of a pricing arrangement may afford the sourcing agent greater confidence that the source will provide the part at the best price, within each subgroup. Having prioritized on the basis of OEM, partnership, and price, each sub-group may further be prioritized according to its quality assurance rating.

In accordance with this embodiment as described above, the prospective source list may be prioritized into the following general classes: OEM class, partner class, first call class, preferred class, standard class, and last option class. These classifications are arbitrary and intended only for purposes of describing the preferred embodiment. The OEM class may include all OEM sources. The partner class may include non-OEM sources have partnership agreements with the sourcing agent. The remaining classes may be defined by the quality assurance rating of the class member sources.

In another embodiment, the prioritization of the prospective source list may be performed according to a weighted set of the indexing fields including the quality assurance rating of the respective sources. For example, it may be preferable to weight the quality assurance rating of a source equally with one or more of its other indexing fields. Thus, for example, to may be preferable to prioritize the prospective source list so that sources having the highest quality assurance ratings, but no partnership agreement are prioritized higher on the prospective source list then sources having a partnership agreement with the sourcing agent, but lower quality assurance ratings.

Contacting Prospective Sources to Secure a Part:

With the prospective source list prioritized, the sourcing agent or the part requester may contact the sources to determine the source's ability to supply the part. It should be recognized that one benefit of prioritizing the list as described is that the sourcing agent is predicted to have more success sourcing the part more quickly by contacting those sources near the proverbial top of the list, and therefore, the sourcing agent can limit the number of sources he or she contacts from the prospective source list. It will be understood that the prospective source list may display prioritization in ways other than a columner list. The sourcing agent may contact one or more sources to compare the immediate part availability, price, warranty, and the like offered by the source for the part being requested. The information collected from each source contacted may be used to update that source's indexing fields and quality assurance rating. For example, if a source does not have the part available, this may be noted in that source's quality assurance field for part availability. In this way, that source's quality assurance rating will be lowered, which may affect its position on the next prospective source list of which it is a part. Similarly, if several sources have the part, but one source offers a price that is significantly below the others, this may be noted in the source's quality assurance field for price, which may increase its overall quality assurance rating and position on the next prospective source list of which it is a part. Useful data may be collected from these initial contacts between the sourcing agent and the sources even if a particular source is not ultimately used to supply the part. It should be recognized, that over time, the prioritized prospective source list should become a better predictor to the sourcing agent of where parts are most likely to be available. Sources that routinely have parts available at good prices will move up the prioritized prospective source list. Sources that routinely do not have parts available, or who have high prices, will move down the prioritized prospective source list.

Once a part source is selected by the sourcing agent or part requester, additional information concerning that source may be collected and used to update that source's indexing fields and quality assurance fields. For example, part failure may not be noted until some time after the part has been purchased. Nevertheless, this information may be recorded in the pertinent quality assurance file.

The sourcing agent may elect to contact as few or as many sources from the prioritized prospective source list as he or she may feel necessary to provide the part requester with a selection of choices for sourcing the part.

The process of purchasing the part is well known in the art, with the exception that the present invention contemplates a feedback mechanism whereby information collected from each source contact is used to update the factors governing prioritization of the prospective source list.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

We claim:

1. An electronic device for sourcing a medical part, the device comprising:

an electronic sourcing database of medical part source records, wherein the medical part source records includes at least first, second, third and fourth indexing fields, wherein the first indexing field is a contact field, wherein the second indexing field is selected from a group consisting of at least a first part ID field and at least a first part type field, wherein the third and fourth indexing fields are selected from a group consisting of at least a first preferred variable field and at least a first quality assurance field;

a search engine for searching the medical part source records according to at least a first search parameter, wherein the at least a first search parameter is a parameter selected from the group consisting of medical part model number, medical part serial number, medical part manufacturer, medical equipment model number, medical equipment serial number and medical equipment manufacturer, to create a list of prospective medical part sources;

an algorithmic prioritizing device for prioritizing the list of prospective medical part sources based on at least two of the indexing fields; and, an algorithmic prioritizing device for prioritizing the prospective medical part sources based on the part type indexing field, then prioritizing the prospective medical part sources based on the at least a first preferred variable indexing field, then prioritizing the prospective medical part sources based on a quality assurance rating of the prospective medical part sources, wherein the quality assurance rating is measured with respect to at least the first quality assurance indexing field wherein the at least a first quality assurance indexing field is selected from the group consisting of timeliness of delivery of parts by the prospective medical part sources, part accuracy, and part quality, wherein the list is prioritized based on a predictive measure of which prospective part source is most likely to be able to provide a part, wherein the prospective part sources can be selected in a preferential order, wherein the first preferred variable field is chosen from the group comprising a pricing arrangement between the prospective part source and an associated user, an exclusive partnership arrangement between the prospective part source and the associated user, a warranty arrangement between the prospective part source and the associated user, and a shipping arrangement between the prospective part source and the associated user;

an electronic ordering device for ordering an associated part;

an algorithm for receiving data regarding the part sources in order to provide prioritizing;

a network connection between the associated user and the database, permitting the associated user to order the part;

means for shipping the part to the associated user; and means for automatically selectively updating the indexing fields of the part source record of the at least a first part source contacted.

2. The device of claim 1, wherein calculation of the quality assurance rating includes an average of field compliance factors calculated with respect to at least first and second quality assurance indexing fields, wherein the prospective part sources can obtain different ratings in different categories.

3. The device of claim 2, further comprising a global computer network for contacting at least a first part source from the list of prospective part sources to order the part.

4. The device of claim 3, wherein the field compliance factors are automatically updated.

5. The device of claim 2, wherein the calculation of the field compliance factor includes a number of positive transactions with the part source and a total number of transactions with the part source, wherein the part source is a vendor of parts.

6. A method of sourcing a medical part, the method comprising the steps of:
  creating an electronic part request record, wherein the part request record includes at least a first parameter selected from a group consisting of part model number, part serial number, part manufacturer, equipment model number, equipment serial number and equipment manufacturer;
  providing an electronic sourcing database of medical part source records, wherein the medical part source records includes at least first, second, third and fourth indexing fields,
  wherein the first indexing field is a contact field,
  wherein the second indexing field is selected from a group consisting of at least a first medical part ID field and at least a first part type field,
  wherein the third and fourth indexing fields are selected from a group consisting of at least a first preferred variable field and at least a first quality assurance field;
  using a network search engine to search the medical part source records according to the at least a first search parameter;
  electronically prioritizing, using at least a first algorithm, a list of prospective medical part sources based on at least two of the indexing fields;
  prioritizing, using the at least a first algorithm, the prospective medical part sources based on the part type or part ID indexing field;
  then further prioritizing the prospective part sources based on the at least a first preferred variable indexing field;
  then further prioritizing the prospective medical part sources based on a quality assurance rating, wherein the quality assurance rating is measured with respect to at least the first quality assurance field wherein the at least a first quality assurance indexing field is selected from the group consisting of timeliness of delivery of a medical part by the medical part source, part accuracy, part cost, and part quality, wherein the list is prioritized based on a predictive measure of which prospective part source is most likely to be able to provide a part, wherein the prospective part sources can be selected in a preferential order, wherein the first preferred variable field is chosen from the group comprising a pricing arrangement between the prospective part source and an associated user, an exclusive partnership arrangement between the prospective part source and the associated user, a warranty arrangement between the prospective part source and the associated user, and a shipping arrangement between the prospective part source and the associated user;
  providing an electronic ordering device, such that an associated user can order an associated part;
  providing an algorithm for receiving data regarding the part sources in order to provide prioritizing;
  providing a network connection between the associated user and the database, thereby permitting the associated user to order the part;
  providing means for shipping the part to the associated user;
  contacting at least a first medical part source from the list of prospective medical part sources to order the medical part; and
  automatically selectively updating the indexing fields of the part source record of the at least a first part source contacted.

7. The method of claim 6, wherein, following the step of creating a part request, the method further includes:
  providing a parts inventory; and
  searching the parts inventory according to the at least a first parameter.

8. The method of claim 6, wherein the step of selectively updating the indexing fields of the part source record of the at least a first part source contacted involves the step of updating the quality assurance rating of the at least a first quality assurance field.

9. The method of claim 6, wherein the part request record is remotely, electronically accessible to an associated purchaser.

* * * * *